US007899706B1

(12) United States Patent  (10) Patent No.: US 7,899,706 B1
Stone et al.  (45) Date of Patent: Mar. 1, 2011

(54) SYSTEMS AND METHODS FOR DYNAMIC PRIVACY MANAGEMENT

(75) Inventors: M. Jeffrey Stone, Overland Park, KS (US); Sei Y. Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 16 days.

(21) Appl. No.: 11/432,188

(22) Filed: May 11, 2006

(51) Int. Cl.
*G06Q 30/00* (2006.01)
(52) U.S. Cl. .............. 705/14.55; 705/14.51; 705/14.53; 705/14.54; 705/14.56; 705/14.66
(58) Field of Classification Search .............. 705/14.49, 705/14.52–14.56, 14.66–14.68
See application file for complete search history.

(56) References Cited

U.S. PATENT DOCUMENTS

| | | | | |
|---|---|---|---|---|
| 5,848,396 | A * | 12/1998 | Gerace | 705/10 |
| 7,496,191 | B1 * | 2/2009 | Crews et al. | 379/220.01 |
| 2001/0036224 | A1 * | 11/2001 | Demello et al. | 375/220 |
| 2001/0056374 | A1 * | 12/2001 | Joao | 705/14 |
| 2002/0022488 | A1 * | 2/2002 | Srinivasan et al. | 455/456 |
| 2002/0128908 | A1 * | 9/2002 | Levin et al. | 705/14 |
| 2002/0173296 | A1 | 11/2002 | Nordman et al. | |
| 2003/0009385 | A1 * | 1/2003 | Tucciarone et al. | 705/26 |
| 2003/0115105 | A1 * | 6/2003 | Lin et al. | 705/26 |
| 2004/0122730 | A1 * | 6/2004 | Tucciarone et al. | 705/14 |
| 2005/0043989 | A1 * | 2/2005 | Shifrin | 705/14 |
| 2005/0096975 | A1 * | 5/2005 | Moshe | 705/14 |

OTHER PUBLICATIONS

Brick Store Museum Newsletter, Nov. 2005.*
"Live365 to Offer Opt-In Advertising on Its Website", story from Yahoo! Finance. Oct. 15, 2004.*
Information Week Free Subscription form, Jun. 2004. Online edition hosted by www.tradepub.com.*
Medtronic Privacy Statement, last revised Oct. 31, 2001.*
Internet Archive Wayback Machine archive of Whatis.com—definition of "Short Message Service", Apr. 2005.*
"Mobileway offers platforms for in-house SMS marketing". McAuliffe, Wendy. New Media Age, Jul. 31, 2003. Available at <http://www.accessmylibrary.com/article/print/1G1-106558128>.*
"You are receiving this email because you asked to be sent special Newsletters offered by Handwritings.com". Handwritings.com, Apr. 2002. Available from <http://www.handwritings.com/newsletters/April_2k2_handwritings_newsletter.htm>.*
How Computers Work, Millennium Edition. White, Ron. Que Publishing, Indianapolis, 1999. ISBN 0/7897-2112-0. Chapters 1-9, 14-31 included.*

(Continued)

*Primary Examiner*—Andrew J. Fischer
*Assistant Examiner*—Christopher C Johns

(57) ABSTRACT

Systems and methods for dynamic privacy management are disclosed. In some embodiments, a customer may accept or reject using the text-messaging feature of his mobile phone offers of discounted goods or services from a partner in exchange for the customer's consent allowing the vendor to release the customer's personal information to the vendor. By controlling dissemination of his personal information in this way, a customer may tailor his own dynamic privacy agreement with the provider in an informal manner and with very little effort. The customer may also control the amount of spam he receives from vendors by specifying the types of offers he is or is not receptive to.

19 Claims, 5 Drawing Sheets

OTHER PUBLICATIONS

How Networks Work, Millennium Edition. Derfler, Frank and Les Freed. Que Publishing, 2000 ISBN 0-7897-2445-6. Front and back matter, chapters 1-27 provided.*

Crews, John C., et al.; "Integrated Privacy Rules Engine and Application", U.S. Appl. No. 10/738,763, filed Dec. 17, 2003.

Fultz, David, et al.; "Rules Engine Architecture and Implementation", U.S. Appl. No. 10/738,598, filed Dec. 17, 2003.

Ramanujan, Anu, et al.; "Customer Data Privacy Implementation", U.S. Appl. No. 11/047,021, filed Jan. 31, 2005.

* cited by examiner

SYSTEMS AND METHODS FOR DYNAMIC PRIVACY MANAGEMENT

CROSS-REFERENCE TO RELATED APPLICATIONS

This application has subject-matter related to U.S. patent application Ser. No. 11/047,021, entitled Customer Data Privacy Implementation, inventors Anu Ramanujan, Kemi Y. Ibitayo, Srinivas Pogiri, Laura Haverkamp, and John C. Crews, filed on Jan. 31, 2005, which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Electronic commerce and the Internet are changing the way information about consumers is gathered and used. Unfortunately, most of the changes have resulted in the reduction of consumer privacy. The ease of processing, obtaining and transmitting information has made easier both trading in data as well as collating information from different sources. Information about individuals is often collected and sold without their knowledge or consent. As a result, there is an increasing awareness among consumers about privacy violations, and, with it, an increasing resistance to sharing one's personal information.

In response to federal privacy guidelines, vendors have implemented privacy management systems to manage and protect customer information. Typically, a customer, when purchasing a good on credit or subscribing to a service, is presented with the vendor's privacy policy. These policies detail the extent to which the vendor will protect customer information. In some instances, the policies may be no dissemination of that information, limited dissemination to business partners, or notice that some information may be sold or otherwise provided to third parties. By purchasing the good or subscribing to the service, the customer agrees to the terms of the privacy policy. The customer's only bargaining power with respect to these privacy policies is complete acceptance of the terms by purchasing the good or service or rejection by not purchasing the good or service, a "take it or leave it" proposition. Moreover, because these agreements are entered into on the front end of a purchase of goods or subscription of service and are not later modified, the privacy agreement does not change thereafter. For this reason, the privacy policy must be general, even vague, as to whom the customer's information may be provided in the future. In best-case scenarios, customers may be presented with opt-in or opt-out clauses whereby they agree, or do not agree, to dissemination of their personal information. These clauses too are general and often apply across the board, meaning the customer has no flexibility in deciding to whom their information is provided and to whom it is not. They simply choose to allow dissemination to third parties of the vendor's choosing, or not. In the event a customer chooses to permit sharing of his personal information, he risks being bombarded by volumes of unwanted spam, a possibility that causes many customers to share no personal information at all.

SUMMARY OF THE INVENTION

Systems and methods for dynamic privacy management are disclosed. In some embodiments, the dynamic privacy management method comprises receiving a request for customer information from a vendor for use in connection with an offer for qualified customers, identifying undecided candidates from a customer database, notifying undecided candidates of the offer, and providing undecided candidates a means to grant or deny permission for offers associated with that permission category. The offer is associated with a permission category. The actions of notifying customers of the permission category, and providing those customers with a means to grant or deny permission are performed by a provider with knowledge of customer information and a portal through which instant communications may be exchanged between the provider and each customer. An undecided candidate is a qualified customer that has neither granted nor denied permission for releasing their customer information for offers associated with that permission category. The permission category may include only offers from that vendor, for a specific type of good or service, or for a specific time period. The method may further comprise providing to the vendor the customer information of qualified customers that have granted permission for offers associated with that permission category. Notifying undecided candidates of the offer may include sending a text message to those candidates. That text message may include the means to grant permission for offers associated with that permission category on a limited basis, including a grant of permission conditioned on restricted release of customer information.

Some dynamic privacy management system embodiments comprise a customer information database that stores customer information and customer privacy information and a dynamic privacy management server configured to obtain customer information from the customer information database in response to a customer information request associated with an offer from a third party. The offer is associated with a permission category. In response to an event, the dynamic privacy management server sends to customers identified by information stored in the customer information database a request for permission to release their customer information in exchange for offers associated with that permission category. The event may be the creation of a new permission category, the addition of a new customer to said customer information database, or the expiration of limited acceptance of offers from a permission category. The customer information database may store customer privacy information consisting of customer-defined restrictions on release of customer information to a third party. The dynamic privacy management system may further comprise a vendors' offers database that stores the terms and conditions of offers of discounted goods or services third parties wish to extend to customers and/or a privacy rules database that stores federal rules and guidelines governing how customer information may be disseminated and similar rules internally defined by the provider. The dynamic privacy management server may be configured to obtain applicable privacy rules from the privacy rules database and filter customer information obtained from the customer information database according to the privacy rules to determine what customer information may be released in response to the third party request. The server may be configured to transmit customer information obtained from the customer information database to the third party after filtering the customer information according to the privacy rules obtained from the privacy rules database.

Some method embodiments comprise sending a text message to a mobile device associated with an individual and receiving a response from the individual granting permission in at least one of the permission categories. The text message lists multiple permission categories with an indication of whether that individual has previously granted or denied permission to use customer information of that individual for targeted marketing associated with those permission categories, identifies one or more offers for each of the multiple permission categories, and invites the individual to grant permission in at least one of the permission categories. The text message offers at least one option to grant restricted permission. The restricted permission may allow a one-time usage of the individual's customer information for at least one permission category and/or restricts usage of the individual's customer information for at least one permission category to a specified time period.

These and other features will be more clearly understood from the following detailed description taken in conjunction with the accompanying drawings and claims.

Figure 1:
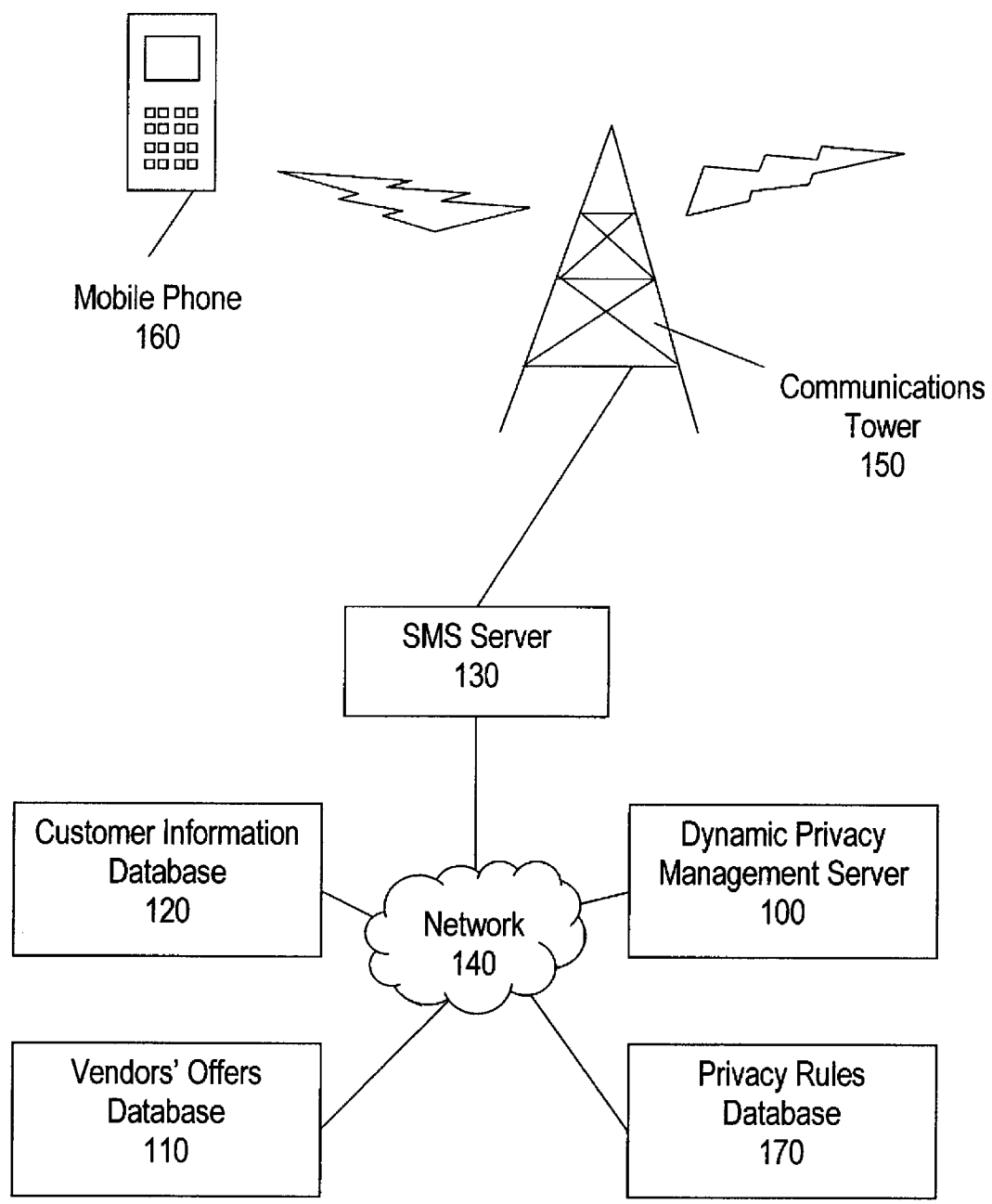
FIG. 1 is a block diagram of an illustrative dynamic privacy management system.

Various embodiments of the invention will now be described with reference to the accompanying drawings, wherein like reference numerals are used for like features throughout the several views. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to suggest that the scope of the disclosure, including the claims, is limited to that embodiment.

NOTATION AND NOMENCLATURE

Certain terms are used throughout the following description and claims to refer to particular components. This document does not intend to distinguish between components that differ in name but not function. In the following discussion and in the claims, the terms "including" and "comprising" are used in an open-ended fashion, and thus should be interpreted to mean "including, but not limited to . . . ".

DETAILED DESCRIPTION OF THE PREFERRED EMBODIMENTS

Customers may be more willing to share some of their personal information with vendors of interest in return for information regarding goods or services—may even be able to agree to an exchange of information for discounts towards those goods and services—if the customers are able to dictate to whom their personal information will be shared and under what conditions. Under the current, static, blanket privacy agreements employed by vendors, this scenario is not possible. A dynamic privacy management system that enables the customer himself to determine who may have access to his personal information on a vendor-to-vendor basis, or other fine-grain basis, will permit a limited sharing of customer information. This system will permit the customer to control dissemination of his personal information while at the same time, allow some vendors access to that information. The system will also permit the customer to receive information of interest in return without being inundated by unwanted spam.

Systems and methods are disclosed dynamic privacy management. The disclosed method may permit a customer to accept or reject using the text-messaging feature of his mobile phone, or another instant communications mechanism such as email, instant messaging, or interactive voice response, offers of discounted goods or services from a vendor in exchange for the customer's consent allowing a provider to release the customer's personal information to the vendor. In this context, the provider is a telecommunications provider or communications service provider with knowledge of customer information and a communications portal through which customer privacy, meaning customer information, may be managed. By controlling dissemination of his personal information in this way, a customer may tailor his own dynamic privacy agreement with the provider in an informal manner and with very little effort.

Vendor offers made may be dependent on the customer's profile. For example, a vendor may desire to extend offers to customers residing in a particular geographic area. Vendor offers as well as customer response to those offers may be made real-time using the text-messaging feature of the customer's mobile phone. Personal information release requests with offers of discounted goods or services may be extended on a vendor-to-vendor basis, depending on the nature of goods or services, on a seasonal basis (e.g. goods or services related to Christmas during the holiday season), or even based on geographic location. Customer information may be released by the provider to the vendor upon the customer's acceptance of the vendor's offer. By granting or denying permission on such a granulated basis, the customer may control the dissemination of his personal information. Moreover, the customer may be given the opportunity to limit the particular personal information that may be disseminated. For example, the customer may agree to release of his name, age and gender, but not his home address or phone number. The customer may limit the extent to which his personal information may be used, e.g. one time only or for a defined period of time. The customer may be presented with the option to change his mind, meaning he may be provided with a means to discontinue receipt of advertising from a particular vendor or regarding a particular category of goods or services if, after some time, he decides he no longer wishes to be contacted by that vendor or receive solicitations regarding goods or services of that nature. By revoking permission for releasing personal information, the customer may also prohibit future use of the customer's personal information by the vendor. Finally, the customer may be reminded on a not-too-frequent basis of opportunities made available to him, his selection regarding those opportunities (e.g. rejection of all offers related to sporting goods), and may be presented with the means to change his selection.

As the provider stores and updates customer preferences regarding the types of offers the customer is or is not receptive to, whether on a vendor-to-vendor basis, or some other basis, a customer tailors his own granulated, dynamic privacy agreement with the provider regarding the use of his personal information. In addition to allowing the customer to control dissemination of his own personal information, a dynamic privacy management system may permit a customer to control the number of solicitations he receives from vendors. By specifying the types of offers to which he is or is not receptive, a customer may control the type of information that will be sent to him. Offers of goods or services may only be sent to a customer when the customer has consented to solicitations of that type; otherwise, no offer may be extended. Allowing a customer to easily control and modify his privacy agreement with the provider using a dynamic privacy management system may cause customers to more willingly share their personal information and allow vendors to gain greater access to customer information collected by the provider.

Before describing the disclosed systems and methods in detail, it is helpful to revisit some privacy management basics. While a provider has some flexibility with respect to its own internal privacy practices regarding customer information, it must at a minimum comply with federal guidelines and other legal requirements that dictate how customer information is to be maintained. For example, the Federal Trade Commission (FTC) set forth guiding privacy principles of notice, choice, access and security in a document entitled "Fair Information Practices in the Electronic Marketplace." The FTC also enforces the Gramm-Leach-Bliley Act, which defines privacy obligations for entities dealing with certain types of consumer financial information. Under the Telecommunications Act, the Federal Communications Commission (FCC) regulates Customer Proprietary Network Information, including customer usage data.

As long as the provider complies with these federal guidelines, it may implement whatever privacy policy it desires. Moreover, it may enter into a business partnership with another vendor who is willing to pay for access to the customer information that the provider has collected. Depending on the provider's business, the customer information it has collected may be a wealth of information with which a vendor could hone its marketing strategies. Keeping within the federal privacy guidelines, a provider may release customer information to a vendor as long as it gives notice to and obtains consent from the customer. Until now, notice has been typically achieved via a static, general privacy policy presented to each customer who opens an account with the provider, whereas consent is implied by the customer's acceptance of the provider's goods or services.

In accordance with the present disclosure, a dynamic privacy agreement may instead be implemented between the provider and its customer. This dynamic agreement may be implemented using, for example, a short messages system ("SMS"), which is a wireless telephony technology available on most digital mobile phones. It permits the sending and receiving of short messages, known as text messages, between mobile phones and other handheld devices. Messages are sent via a store-and-forward mechanism to a SMS Center, which will attempt to send the message to the recipient and possibly retry if the user is not reachable at a given moment. Both mobile terminated (for messages sent to a mobile handset) and mobile originated (for messages that are sent from the mobile handset) messaging are supported. SMS text messaging is but one means for messages to be sent, received, and responded to real-time. Using text messaging, or another instant communications mechanism such as email, instant messaging, or interactive voice response, a provider may implement a dynamic privacy management system wherein the provider may create and maintain an individualized, dynamic privacy policy with each of its customers, allowing a customer to control dissemination of his personal information from the provider to interested third parties and those parties access to the customer's personal information through the provider. This dynamic privacy management system may also allow the customer to control how many solicitations are sent to the customer by vendors in partnership with the provider.

A provider may use the dynamic privacy management system depicted in FIG. 1. This dynamic privacy management system comprises a computer network 140, a communications tower 150, and a mobile phone 160. The computer network 140 further comprises an SMS server 130, a dynamic privacy management server 100, a customer information database 120, a privacy rules database 170, and a vendors' offers database 110, all in communication with each other through a computer network 140. The communications tower 150 is connected to the SMS server 130. This SMS server 130 transmits SMS text messages generated by the dynamic privacy management server 100 to a mobile phone 160 via the communications tower 150. It also receives, via communications tower 150, text messages entered by the mobile phone user into the mobile phone 160 in response to those sent by the dynamic privacy management server 100. Although only one mobile phone 160 is depicted, it is to be understood that multiple mobile phones may simultaneously connect to the SMS server 130 via the communications tower 150 and that the single mobile phone 160 is intended to represent one or more such phones.

The customer information database 120 may store personal information collected by the provider from its customers. This information may include a customer's name, address, telephone number, age, gender, and credit card number. The customer may specify what information may be disseminated to vendors upon acceptance of offers from those vendors and what information the customer prefers not to share. For example, a customer may agree to dissemination of his name, age and gender, but not his address or home telephone number. These customer preferences may be stored in the customer information database 120. Also, when the dynamic privacy management server 100 receives a customer's response to an offer in the form of a text message sent via the customer's mobile phone 160, this dynamic privacy management server 100 may transmit this response to the customer information database 120 for storage. The dynamic privacy management system may use this information to identify individuals who have rejected offers so that it may from time to time contact those individuals to let them know what opportunities these customers have missed. It may also use this information to identify customers who have already granted or denied permission so as to avoid contacting those individuals again with regards to offers in the same category.

Other customer-specific information may be stored on the customer information database 120. The provider may track information related to customer usage of its goods or services. For example, many wireless phone service customers subscribe to other wireless services, such as internet access. As a customer surfs the internet using his mobile phone, websites visited by him may be stored, along with other customer information, on the customer information database 120. This website information may be indicative of the customer's likes and interests and used, like other information stored on this customer information database 120, by vendors to target potential customers for their goods and services.

The vendors' offers database 110 may store information describing the terms and conditions of offers extended by vendors in partnership with the provider to the provider's customers, including a history of offers made in the past and those to be offered in the future. This vendors' offers database 110 may also store statistics regarding the acceptance or rejection of offers extended to customers. If made available by the provider to the vendor, a vendor may hone his marketing efforts using this information. For example, the vendor may witness a trend in acceptance of certain types of offers from a particular cross-section of the customer base, such as men over 30 years of age, and consequently target similar future offers towards that particular group. The vendor may experience repeated acceptance of certain types of offers from some individuals and then target those individuals in the future with similar offers.

The privacy rules database 170 stores information regarding how the data stored in the customer information database 120 is to be disseminated. This privacy rules database 170 stores the various government regulations and provider policies that restrict access to customer information stored on the customer information database 120 by the vendors. When an offer, defined by information stored in the vendors' offers database 110, is extended to and accepted by a customer, the flow of customer information stored on the customer information database 120 to the vendor extending the offer is limited by the privacy rules stored on the privacy rules database 170. For example, if a privacy rule has been defined which prohibits the dissemination of the customer's address, the dynamic privacy management system may not permit the sharing of the customer's address even though the customer has granted permission in response to a particular offer and in which the offering vendor has requested the customer's address. The dynamic privacy management system may, however, release other customer information, as permitted by the privacy rules.

Finally, the dynamic privacy management server 100 implements the dynamic privacy management method. This dynamic privacy management server 100 may transmit a text message requesting permission to release customer information in connection with an offer stored on the vendors' offers database 110 from a vendor to a customer via his mobile phone 160. It may receive the customer's response to this request in the form of text message sent via the customer's mobile phone 160. This server may transmit this response to the customer information database 120 for storage. If the customer has denied permission, the dynamic privacy management server 100 may not take any further immediate action with regards to this offer. Alternatively, if the customer has granted permission, the dynamic privacy management server 100 may release customer information to the vendor and possibly transmit the terms of the offer stored on the vendors' offer database 110 to the customer, again in the form of a text message that the customer receives on his mobile phone 160 or in some other form as noted earlier or recognized by those of skill in the art. It may also access customer information on the customer information database 120 and applicable privacy rules stored on the privacy rules database 170. The dynamic privacy management server 100 may then release permissible customer information stored on the customer information database 120 to the vendor extending the offer.

The dynamic privacy management server 100 may receive text messages from customers who have previously granted permission but have changed their minds and wish to revoke permission so as to discontinue receiving information from that particular vendor. In that circumstance, the dynamic privacy management server 100 may then transmit information describing this change to the customer information database 120 for storage. This dynamic privacy management server 100 may from time to time access the customer information database 120 and the vendors' offers database 110 and transmit text messages to customers to inform them of available offers, to remind them of their selections regarding relevant permission categories, e.g. grant or denial, and to invite them to change their selections as desired.

Even though only one dynamic privacy management server 100 is shown, it is to be understood that multiple servers may simultaneously connect to the computer network 140 in order to distribute the demand placed on the dynamic privacy management system. Such a distribution among multiple dynamic privacy management servers may cause the dynamic management system to operate faster and more reliably. For example, even if one server fails, the others may remain operational and customers may still be able to receive offers and respond to them.

Figure 2:
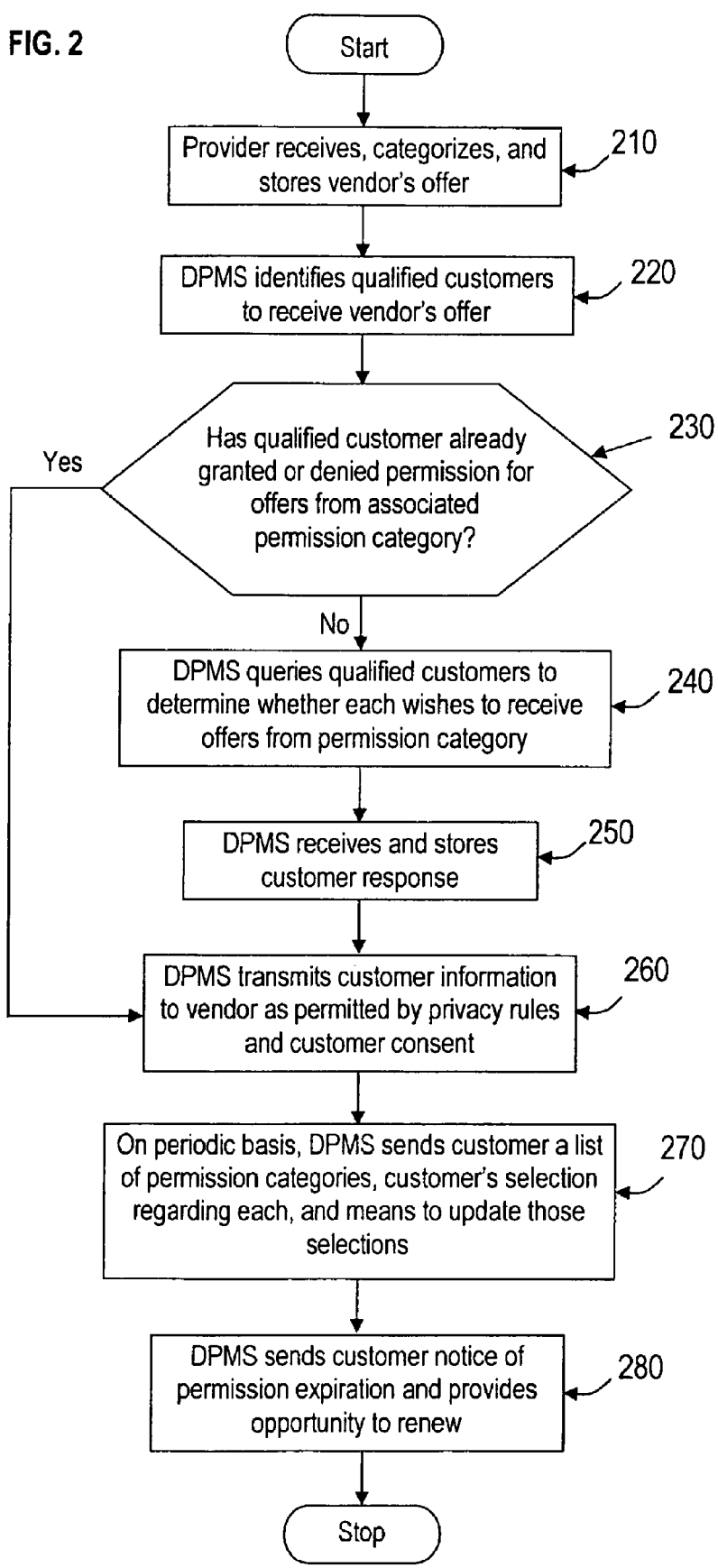
FIG. 2 is a flowchart of an illustrative method implemented by the dynamic privacy management system.

Referring next to FIG. 2, a flowchart is provided to illustrate various method embodiments for dynamic privacy management. The method embodiments may begin when a vendor, who wishes to extend an offer to the provider's customer base in exchange for acquiring personal customer information, transmits the terms and conditions of that offer to the provider, who in turn receives and stores that information in the vendors' offers database 110 (block 210). The terms and conditions of the offer may include descriptions of customers the vendor wishes to solicit, e.g. men over 30 years of age, the discounted goods and/or services offered, and customer information sought in exchange, e.g. phone number, email address, etc.

The vendor and provider may then decide in which permission category to include the vendor's offer. A permission category may be defined as a category of offers that the customer may, or may not, consent to releasing his personal information so as to receive such offers from the vendor. The provider may define permission categories on a vendor-to-vendor basis, depending on the nature of goods or services offered, on a geographic basis, or some other basis. Some examples of permission categories may be "Eddie Bauer" (offers of goods only from Eddie Bauer), "sporting goods" (offers of sporting goods from all vendors dealing in such goods), "Southwest Houston" (offers of goods or services from vendors located in southwest Houston), "Christmas" (offers of goods or services related to Christmas), etc. If a customer consents to receiving offers from a permission category, vendor offers included in this permission category may be extended to the customer. On the other hand, if a customer does not consent to a particular permission category, no vendor offers included in this permission category may be extended to the customer. For example, customer consent to receipt of offers from the "Christmas" permission category may mean that the customer may be extended all vendor offers related to Christmas goods or services.

The dynamic privacy management server 100 may detect that a new vendor offer has been extended by inputting the appropriate command locally at the console of the dynamic privacy management server 100 or remotely through the network interface of the dynamic privacy management server 100. Alternatively, the dynamic privacy management server 100 may be programmed to periodically access the vendors' offers database 110 to determine if new offers have been extended, meaning stored in the vendors' offers database 110.

Having detected the new offer stored in the vendors' offers database 110, the dynamic privacy management server 100 may next identify customers qualified to receive the vendor's offer (block 220). This may be a multi-step task. First, the dynamic privacy management server 100 may access information stored in the vendors' offers database 110 to determine whether the vendor has identified a particular cross-section of the vendor's customer base. The vendor may wish to target the entire customer base, or subsets of it, for example, men over 30 years of age. This information may be included as part of the terms and conditions of the offer stored in the vendors' offers database 110. Using this descriptive information, the dynamic privacy management server 100 may filter from the provider's customer base customers who do not fit the vendor's desired criteria by sorting through customer information stored on the customer information database 120, leaving only customers identified who fit the vendor's desired criteria or qualified customers.

Second, the dynamic privacy management server 100 may cross-check the particular customer information sought by the vendor, in exchange for the offer of discounted goods and/or services, against the information that a qualified customer is willing to share. Customer information sought by the vendor may be stored in the vendors' offers database 110 as a condition of the offer, while information a customer may be willing to share may be stored in the customer information database 120. The dynamic privacy management server 100 may compare the information sought by the vendor to information a qualified customer is willing to share. If the customer is unwilling to share the information sought by the vendor, that customer may no longer be considered qualified to receive the vendor's offer. Otherwise, the customer remains qualified to receive the vendor's offer.

Figure 3:
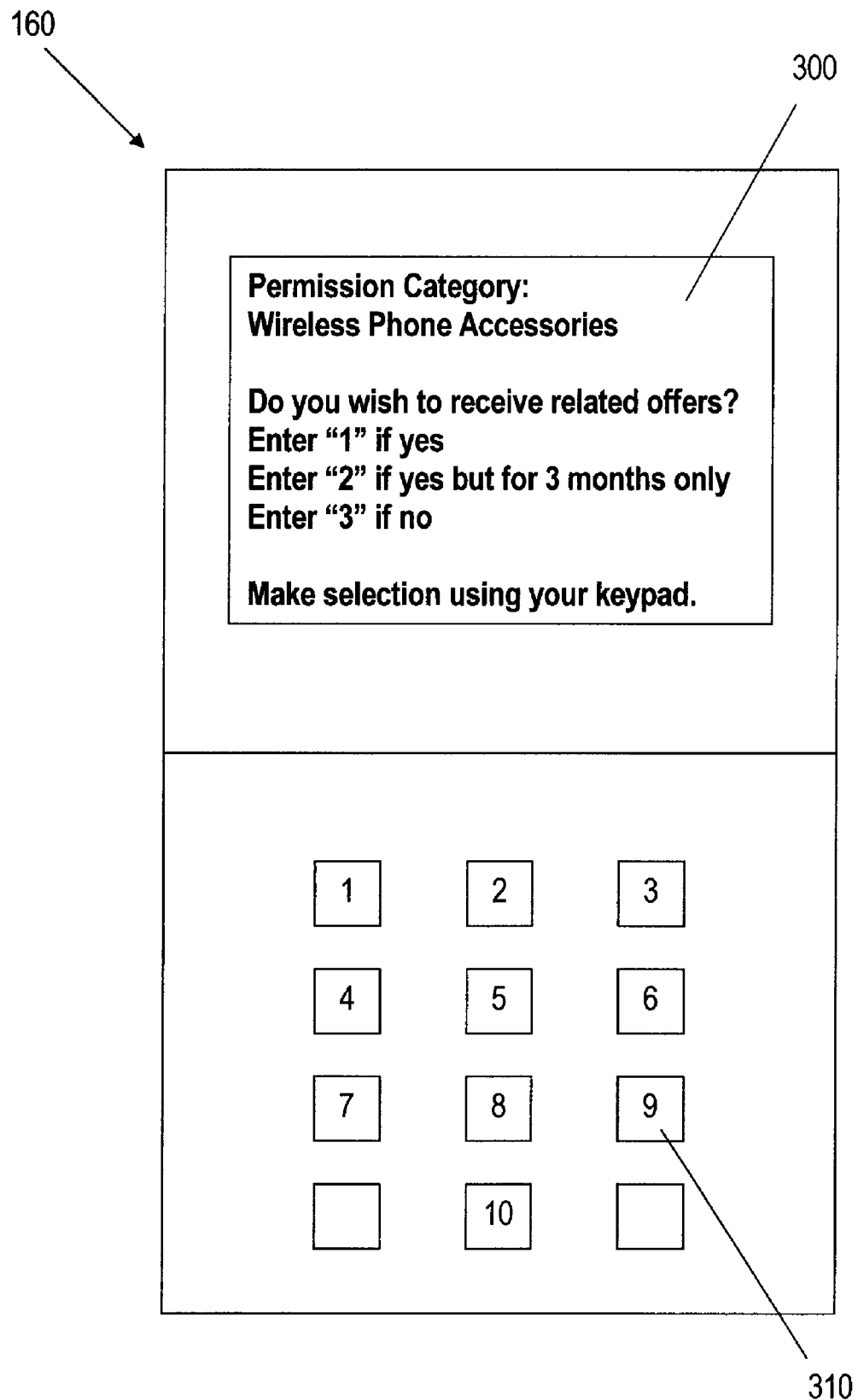
FIG. 3 is an illustrative example of a short messages system ("SMS") text message.

After the dynamic privacy management server 100 has identified qualified customers (block 220), it distinguishes those qualified customers who have already granted or denied permission for offers from the permission category associated with the vendor's offer from those qualified customers who have not (block 230). Then the dynamic privacy management server 100 may send a text message to each qualified customer who has not already granted or denied permission for offers from the particular permission category via his mobile phone 160 (block 240). This text message may ask the customer whether he wishes to receive offers of discounted goods or services included in this permission category, in exchange for the customer's personal information. The customer may then respond by accepting, rejecting, or accepting with limitations, such as for a limited time. FIG. 3 depicts an illustrative text message 300 received on a mobile phone 160 notifying a customer that a permission category has been defined and that category is "wireless phone accessories." This text message inquires if the customer wishes to receive offers of goods in this category. Using his mobile phone keypad 310, the customer may respond by selecting "1" for an unqualified acceptance of offers in this permission category, "2" for acceptance for a limited time period of three months only, or "3" for a rejection of all offers in this permission category. This text message is illustrative only. Obviously, the text message may contain more or less detail as required and the customer may be provided with greater flexibility in his response choices. For example, the customer may be presented with response choices including acceptance for a limited period of time (e.g. several days, weeks, or months), for a limited number of uses (e.g. use is permitted for one, three, or five times only), or for a limited number of uses during a defined period of time (e.g. once per week, twice per month). Returning to FIG. 2, the dynamic privacy management server 100 receives the customer's response and transmits this information to the customer information database 120 for storage (block 250).

Next, the dynamic privacy management server 100 may transmit customer information to the vendor as permitted by the privacy rules and customer consent (block 260). Prior to doing so, the dynamic privacy management server 100 may access customer information stored in the customer information database 120, customer information requested by the vendor as defined by the conditions of the offer stored in the vendors' offers database 110, and applicable privacy rules stored in the privacy rules database 170. The dynamic privacy management server 100 may then perform a cross-check of customer information requested by the vendor against the privacy rules to ensure that the requested customer information may be released to the vendor. If there is no privacy rule prohibiting the release of customer information requested by the vendor, the dynamic privacy management server 100 may transmit the requested customer information to the vendor for each qualified customer who has granted permission for offers from the permission category associated with the vendor's offer. If a privacy rule prohibits dissemination of any customer information requested by the vendor, the dynamic privacy management server 100 may not transmit this information to the vendor.

Upon receipt of requested customer information, the vendor may extend its offer of discounted goods or services to the customer by text-messaging, email, land mail, fax or telephone. In another embodiment, the provider may instead extend the vendor's offer of discounted goods or services to the customer on behalf of the vendor by accessing the terms and conditions of the vendor's offer stored in the vendors' offer database 110 and then transmitting the details of the offer to the customer by text-messaging, email, land mail or telephone. Each offer extended to a customer may, in addition to the details of the offer itself, contain a means for discontinuing the receipt of information from the vendor should the customer desire to do. Use of the customer's information by the vendor is limited by the customer's consent. For example, if the customer has consented to use of his personal information for a limited time, say three months, the vendor may only use the customer's personal information for that length of time. After that, the vendor may be prohibited from continued use the customer's personal information.

From time to time, preferably on a yearly or quarterly basis, the dynamic privacy management server 100 may transmit a text message to each customer containing a list of all permission categories available (block 270). This message may provide typical examples of discounted goods or services offered in some or all of the permission categories, illustrating the benefits available to consenting customers. The text message may be personalized with respect to each customer by including the customer's current selection regarding each permission category, e.g. acceptance or rejection of offers from that category. The text message may also contain the means for a customer to keep or modify his selections. By periodically sending such a text message, the customer may be provided with the opportunity and means to easily and conveniently review and modify his own privacy agreement with the provider so that it remains in keeping with his own personal preferences and interests. At the same time, he is provided with the up-to-date information so that he may make informed selections.

The dynamic privacy management server 100 may also transmit a text message to each customer upon the expiration of that customer's limited acceptance of offers associated with a particular permission category (block 280). The purpose of this text message may be to invite the customer to grant unconditional acceptance or to simply renew his limited acceptance for future offers in that permission category. For example, a customer may grant acceptance of offers associated with the permission category "wireless phone accessories" for three months only. At the expiration of that three-month period, the dynamic privacy management server 100 may transmit a text message to the customer informing him that his limited acceptance of offers associated with "wireless phone accessories" has expired and inviting him to grant unlimited acceptance of future offers in that permission category or to simply renew limited acceptance for another three-month period.

Figure 4:
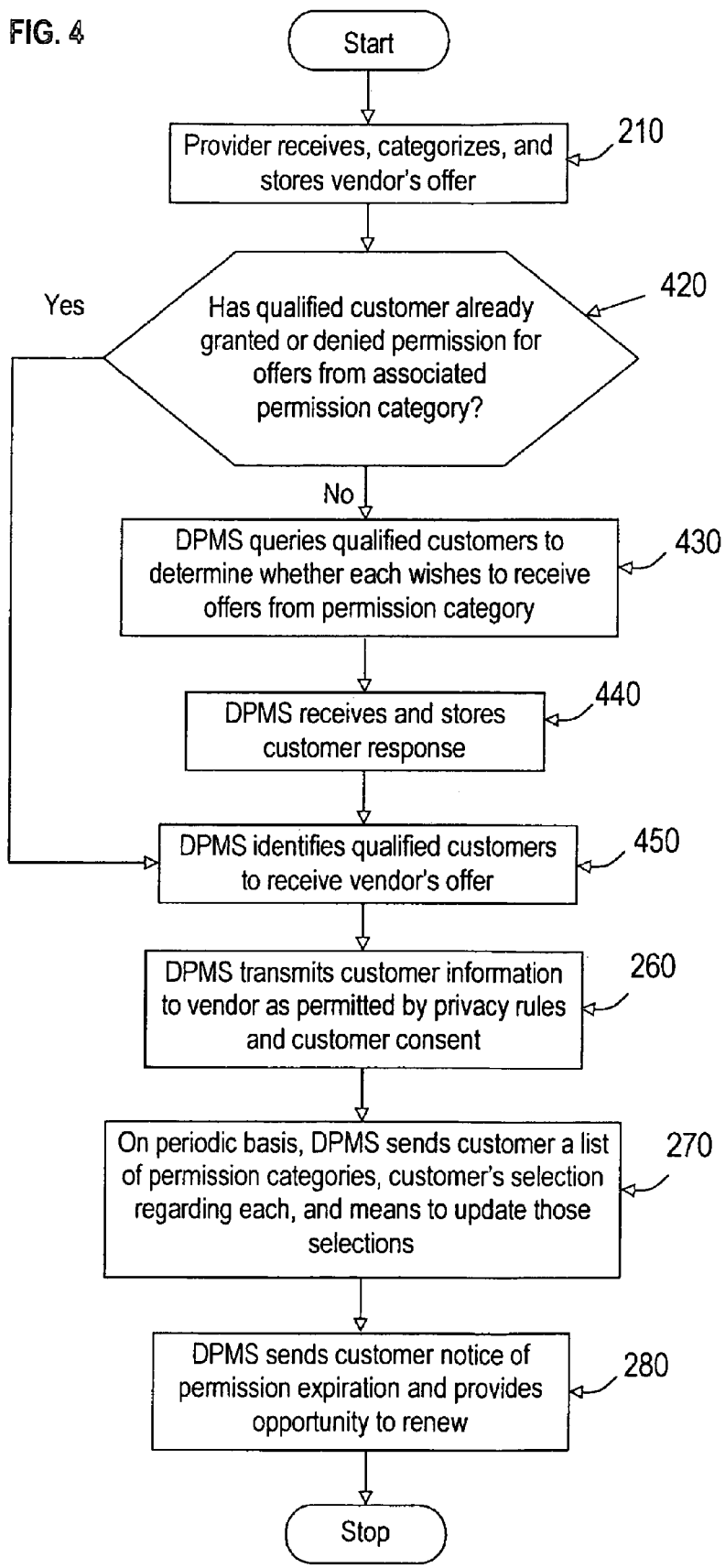
FIG. 4 is a flowchart of another illustrative method implemented by the dynamic privacy management system.

Turning now to FIG. 4, a flowchart is provided to illustrate another method embodiment for dynamic privacy management. The only difference between the method embodiment illustrated by this figure and the method embodiment previously discussed and illustrated by FIG. 2 is that the dynamic privacy management server 100, following the method embodiment depicted in FIG. 4, identifies qualified customers to receive the vendor's offer (block 450) after all customers have either granted or denied permission for offers from the permission category associated with the vendor's offer (blocks 420 through 440). This difference permits notification of all customers and an opportunity to grant permission for offers in a permission category, which may be a new permission category or simply new to some customers (e.g. new customers), whether or not each customer qualifies for the current offer. Aside from this difference, the remaining steps in the method embodiment, specifically, receiving, categorizing, and storing the vendor's offer (block 210), transmitting customer information to the vendor (block 260), periodically contacting the customer regarding permission categories and his selections (block 270), and notifying the customer that his limited acceptance of offers associated with a permission category has expired (block 280), are identical.

Although FIGS. 1 through 4 depict the implementation of dynamic privacy management through the use of SMS text messaging, other means of instant communication may be employed instead of or in addition to text messaging. For example, instant communications mechanisms such as email, instant messaging, or interactive voice response may also permit the provider to implement dynamic privacy management systems and methods.

Figure 5:
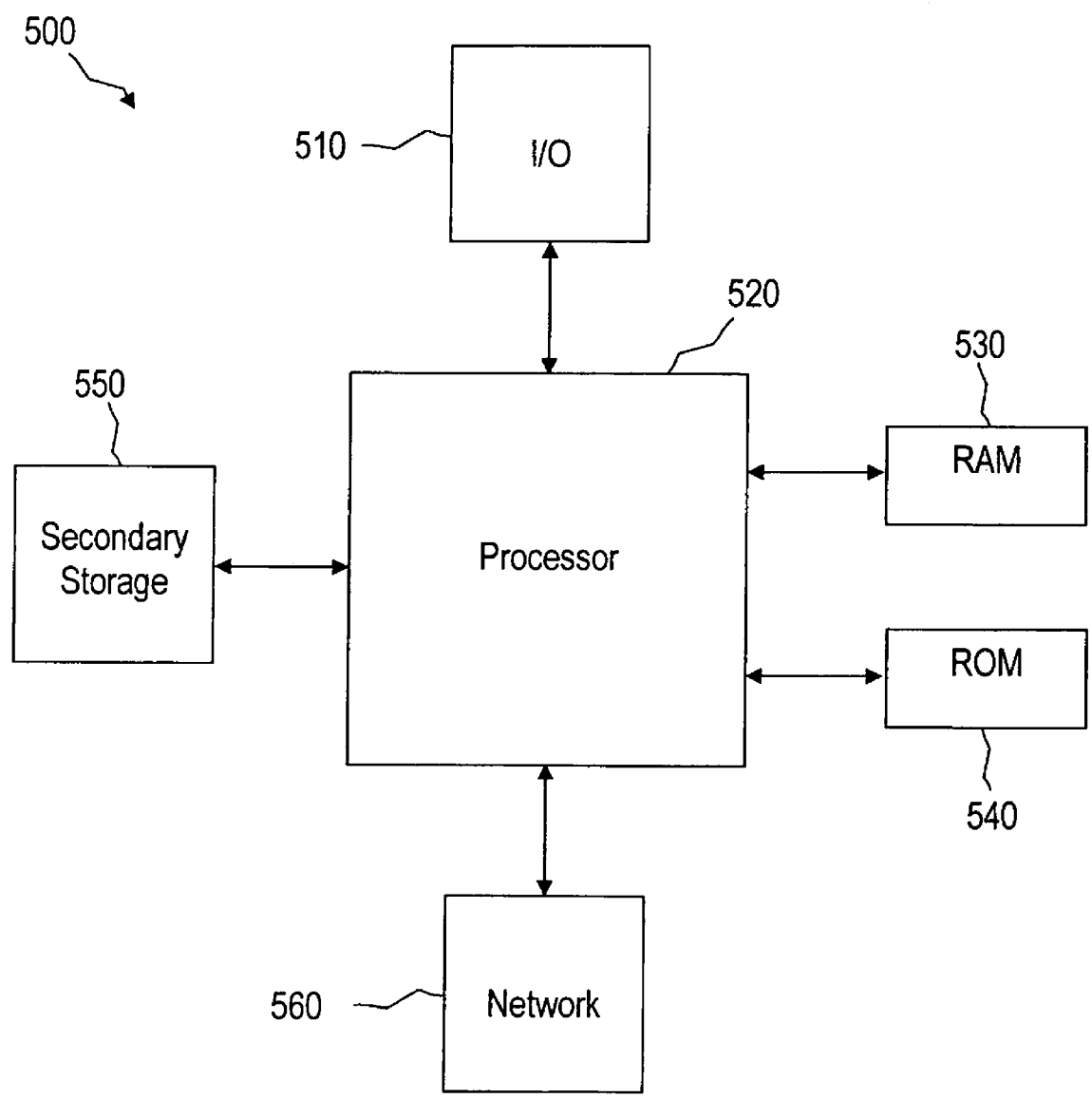
FIG. 5 is an illustrative general purpose computer system suitable for implementing the dynamic privacy management system.

The systems and methods described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 500 includes a processor 520 (which may be referred to as a central processor unit or CPU) that is in communication with memory devices including secondary storage 550, read only memory (ROM) 540, random access memory (RAM) 530, input/output (I/O) devices 510, and network connectivity devices 560. The processor may be implemented as one or more CPU chips.

The secondary storage 550 is typically comprised of one or more disk drives or tape drives and is used for non-volatile storage of data, and as an over-flow data storage device if RAM 530 is not large enough to hold all working data. Secondary storage 550 may be used to store programs which are loaded into RAM 530 when such programs are selected for execution. The ROM 540 is used to store instructions and perhaps data which are read during program execution. ROM 540 is a non-volatile memory device which typically has a small memory capacity relative to the larger memory capacity of secondary storage. The RAM 530 is used to store volatile data and perhaps to store instructions. Access to both ROM 540 and RAM 530 is typically faster than to secondary storage 550.

I/O devices 510 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 560 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity R56011 devices 560 may enable the processor 520 to communicate with an Internet or one or more intranets. With such a network connection, it is contemplated that the processor 520 might receive information from the network, or might output information to the network in the course of performing the above-described method steps. Such information, which is often represented as a sequence of instructions to be executed using processor 520, may be received from and outputted to the network, for example, in the form of a computer data signal embodied in a carrier wave.

Such information, which may include data or instructions to be executed using processor 520 for example, may be received from and outputted to the network, for example, in the form of a computer data baseband signal or signal embodied in a carrier wave. The baseband signal or signal embodied in the carrier wave generated by the network connectivity devices 560 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 520 executes instructions, codes, computer programs, scripts which it accesses from hard disk, floppy disk, optical disk (these various disk based systems may all be considered secondary storage 550), ROM 540, RAM 530, or the network connectivity devices 560.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A dynamic privacy management method that comprises executing, on at least one processor, the steps of:
    collecting customer information, wherein the collected customer information includes monitored customer usage of goods or services;
    storing the collected customer information in a customer information database wherein the customer information database comprises customer information of customers who have neither granted nor denied permission to receive offers from a specific permission category;
    determining an occurrence of an event wherein the event consists of at least one of receiving an offer correlated to the specific permission category from a vendor to provide to customers in exchange for particular customer information from the customer information database, creation of the specific permission category, and expiration of a customer's preference for the specific permission category;

identifying, responsive to the event, customers in the customer information database who have neither granted nor denied permission to receive offers from the specific permission category;

notifying the identified customers who have neither granted nor denied permission to receive offers from the specific permission category;

providing the notified customers a means to grant or deny permission to receive offers from the specific permission category;

providing a request to accept an offer correlated to the specific permission category from the vendor in exchange for particular customer information to the customers that have granted permission to receive the offers from the specific permission category through the means to grant or deny permission;

restricting the vendor from providing a request to accept offers correlated to the specific permission category to the customers that have denied permission to receive the offers from the specific permission category through the means to grant or deny permission; and restricting the vendor from access to the customer information of the customers that have denied permission to receive the offers from the specific permission category through the means to grant or deny permission, wherein a dynamic privacy management server has knowledge of the customer information stored in the customer information database and a portal through which instant communications are exchanged between the provider and each customer.

2. The method of claim 1, wherein the specific permission category includes only those offers from said vendor.

3. The method of claim 1, wherein the specific permission category includes only those offers for a specific type of good or service.

4. The method of claim 1, wherein the specific permission category includes only those offers for a specific time period.

5. The method of claim 1, wherein said notifying the identified customers includes sending a short messages system text message to the customers.

6. The method of claim 5, wherein said short messages system text message includes said means to grant permission for offers from the specific permission category on a limited basis.

7. The method of claim 6, wherein said short messages system text message includes said means to grant permission for offers from the specific permission category conditioned on restricted release of customer information.

8. A dynamic privacy management system that comprises:

a customer information database in a computer readable storage media that stores customer information and customer privacy information, wherein the customer information includes monitored customer usage of goods or services, and the customer privacy information defines what portions of the customer information stored on the customer information database are disseminated to third parties upon acceptance of offers from the third parties, wherein the customer information database comprises customer information of customers who have neither granted nor denied permission to receive offers from a specific permission category; and a dynamic privacy management server comprising a set of instructions stored in the computer readable storage media that when executed by a processor obtains customer information from the customer information database in response to a request from a third party for a customer to accept an offer associated with the specific permission category in exchange for particular customer information in the customer information database, wherein the dynamic privacy management server further comprises a set of instructions stored in the computer readable storage media that when executed by a processor in response to an event and subsequent to the receiving of the request from the third party, sends a notification to grant or deny permission to receive requests to accept offers associated with the specific permission category to customers who have neither granted nor denied permission to receive requests to accept offers associated with the specific permission category, wherein the event consists of at least one of receipt of the request from the third party, creation of the specific permission category, and expiration of a limited permission to receive requests to accept offers associated with the specific permission category, and wherein the dynamic privacy management server further comprises a set of instructions stored in the computer readable storage media that when executed by a processor in response to each of the notified customers that grant permission to receive requests to accept offers associated with the specific permission category, releases to the vendor the particular customer information based on the customer privacy information stored in the customer information database for customers that accept the offer in exchange for the offer associated with the specific permission category.

9. The system of claim 8, wherein said customer privacy information is customer-defined.

10. The system of claim 8, further comprising a vendors' offers database that stores the terms and conditions of offers of discounted goods or services third parties wish to extend to customers.

11. The system of claim 8, further comprising a privacy rules database that stores federal rules and guidelines governing how customer information may be disseminated and similar rules internally defined by the provider.

12. The system of claim 11, wherein said dynamic privacy management server is configured to obtain applicable privacy rules from said privacy rules database and filter customer information obtained from said customer information database according to the privacy rules to determine what customer information may be released in response to the third party request.

13. The system of claim 12, wherein said dynamic privacy management server is configured to transmit customer information obtained from said customer information database to said third party after filtering the customer information according to the privacy rules obtained from said privacy rules database.

14. The method of claim 1, wherein the identified customers are qualified or unqualified customers, wherein a qualified customer is a customer who fit the vendor's desired demographic criteria included as part of the offer.

15. The system of claim 8, wherein in response to each of the notified customers that deny permission to receive offers from the specific permission category, the dynamic privacy management server restricts the vendor from accessing the customer's information.

16. The system of claim 8, wherein the notified customers have neither granted nor denied permission to receive offers from the specific permission category.

17. The method of claim 1, further comprising providing particular customer information to the vendor in response to a particular customer accepting one of the offers wherein the particular customer information corresponds to the particular customer.

18. The method of claim 1, further comprising:
sending a text message on a periodic basis to a mobile device associated with a customer, wherein the text message:
lists a plurality of permission categories associated with a plurality of vendors with an indication of whether the customer has previously granted or denied permission to receive offers from each of the plurality of permission categories;
identifies one or more offers from each of the plurality of permission categories; and
invites the customer to grant or deny permission to receive offers from at least one of the plurality of permission categories.

19. The system of claim 8, wherein the dynamic management server sends a text message on a periodic basis to a mobile device associated with a customer, wherein the text message:
lists a plurality of permission categories associated with a plurality of vendors with an indication of whether the customer has previously granted or denied permission to receive offers from each of the plurality of permission categories;
identifies one or more offers from each of the plurality of permission categories; and
invites the customer to grant or deny permission to receive offers from at least one of the plurality of permission categories.

* * * * *